July 31, 1923.
J. A. MILLER ET AL
1,463,287
VARIABLE SPEED GEAR
Filed Nov. 5, 1921
3 Sheets-Sheet 1
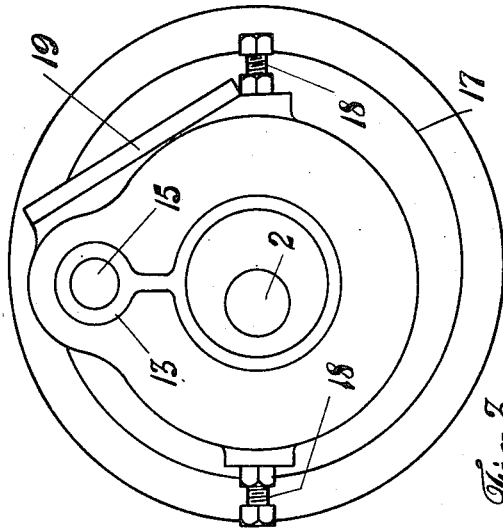
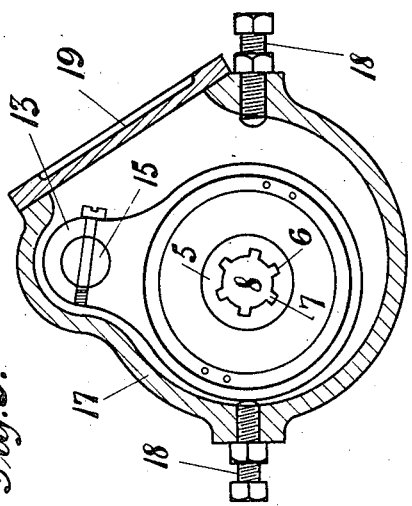
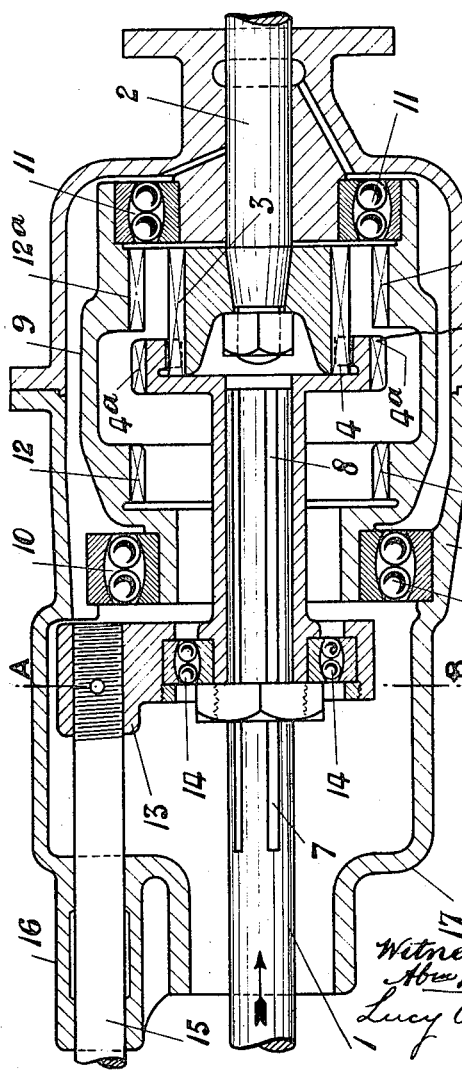
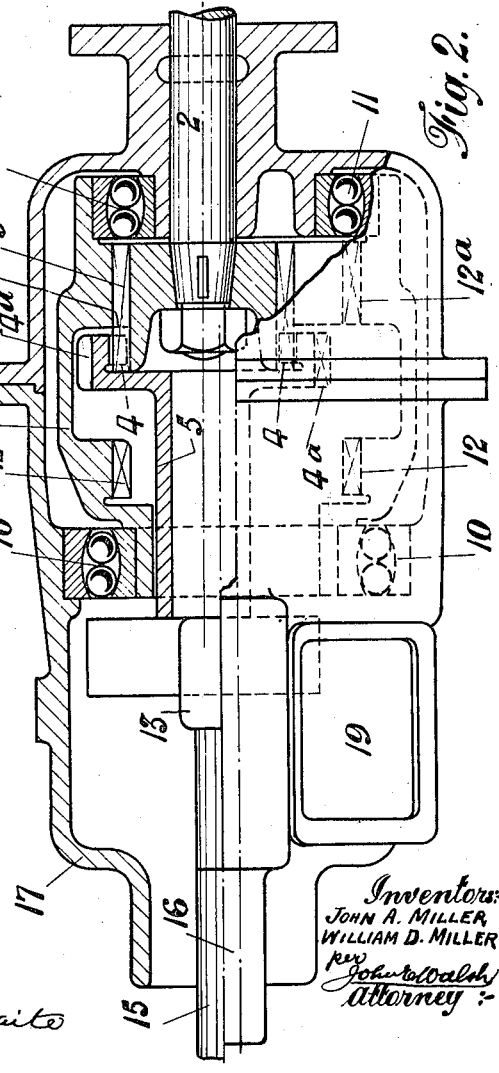

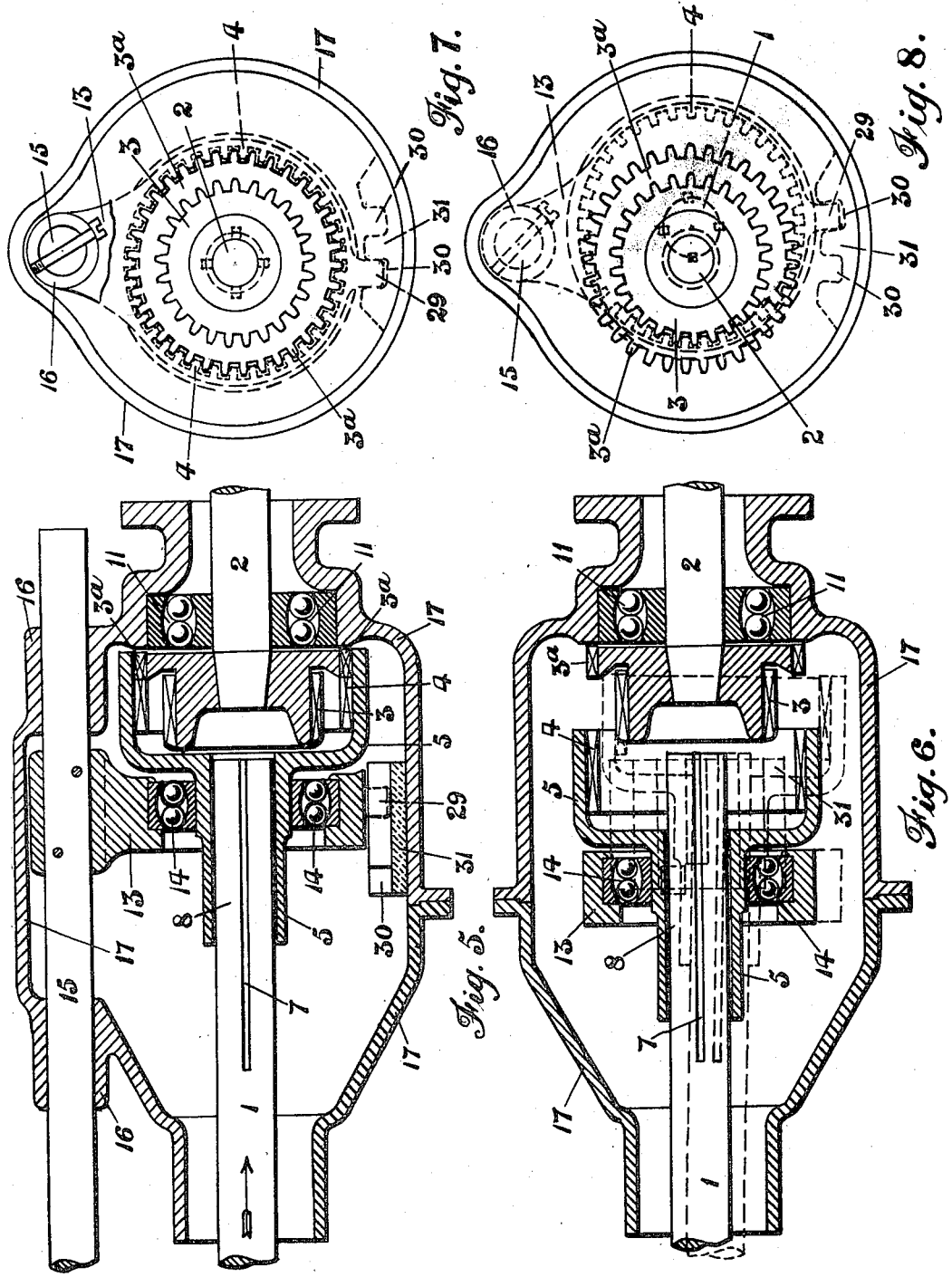

July 31, 1923.
J. A. MILLER ET AL
1,463,287
VARIABLE SPEED GEAR
Filed Nov. 5, 1921
3 Sheets-Sheet 3
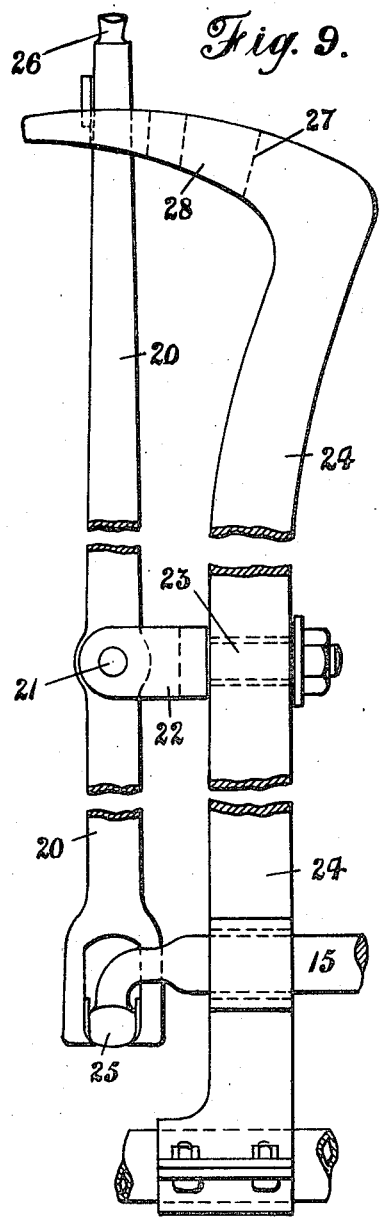
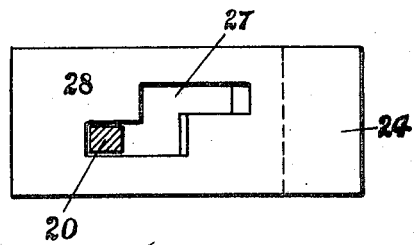
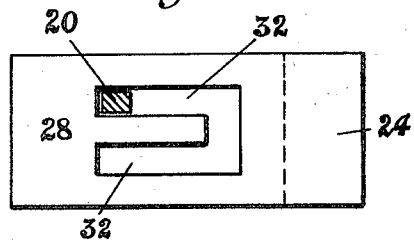
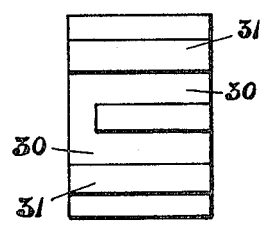
Witnesses
Abm Reed
Lucy Outhwaite
Inventors
JOHN A. MILLER
WILLIAM D. MILLER
per John E. Walsh
attorney Patented July 31, 1923.

1,463,287

UNITED STATES PATENT OFFICE.

JOHN ALEXANDER MILLER AND WILLIAM DOUGLAS MILLER, OF BRIGHOUSE, ENGLAND.

VARIABLE-SPEED GEAR.

Application filed November 5, 1921. Serial No. 513,098.

*To all whom it may concern:*

Be it known that we, JOHN ALEXANDER MILLER and WILLIAM DOUGLAS MILLER, subjects of the King of Great Britain, residing at Brighouse, in the county of York, England, have invented new and useful Improvements in or Relating to Variable-Speed Gears, of which the following is a specification.

The object of this invention is to provide an improved auxiliary gearing intended to be employed in conjunction with change speed gearing of known construction for the purpose of enabling a shaft or the like to be driven at twice the number of different speeds normally obtainable, the invention being specially applicable to motor driven vehicles normally provided with not more than two or three speed changes.

An auxiliary gearing constructed in accordance with our invention, as applied to a motor driven vehicle comprises a pinion in mesh with an internally toothed ring or wheel or the like and means for oscillating the driving portion of the propeller shaft (which is made in two portions) and parts appertaining thereto to occupy two different positions, the arrangement being such that when the driving portion of the propeller shaft and parts appertaining thereto are in one position say an eccentric position with relation to the internally toothed wheel, the drive is transmitted directly from the ordinary gear box through the propeller shaft to the back axle, the auxiliary gearing being inoperative, but when moved to another position, say a concentric position with relation to the internally toothed wheel, the auxiliary gearing comes into action thereby causing variation in the speed at which the back axle would normally be driven.

In a modification of the above device, two pinions of different diameters forming a double wheel is mounted on the driven portion of the propeller shaft, and a modified internally toothed wheel on the drawing portion of said shaft meshes with one or the other of the two pinions, the arrangement being such that when the internal wheel is in a concentric position with relation to the larger of the two pinions, the auxiliary gearing is inoperative, but when moved into an eccentric position with relation to the double wheel, the auxiliary gearing comes into action by the said internal wheel meshing with the lesser of the two pinions thereby causing a variation in speed as aforesaid.

Description of the accompanying drawings.

Fig. 1, is a vertical section of an auxiliary gearing constructed in accordance with our invention as applied to a motor driven vehicle.

Fig. 2, is a plan view, partly in section, of Fig. 1.

Fig. 3, is an end elevation of Fig. 1, looking in the direction of arrow.

Fig. 4, is a section on the line A, B, in Fig. 1.

Fig. 5 is a similar view of a modification of Fig. 1.

Fig. 6 is a sectional plan of Fig. 5 with the driving portion of the propeller shaft and parts appertaining thereto in the initial position when bringing the auxiliary gearing into action, showing in dotted lines their position when said gearing is in action.

Fig. 7 is a sectional end view of Fig. 5 looking in the direction of arrow.

Fig. 8 is a similar view of Fig. 6.

Fig. 9, is a side elevation of means for operating the driving portion of the propeller shaft and the means appertaining thereto, to render the auxiliary gearing operative or inoperative. In this connection it will be noted that the driven shaft 2 is eccentrically mounted with respect to ring gear 9 and casing 17 and that the position of the ring gear 9 in the casing and to the shaft 2 is fixed while shaft 1 and sleeve 5 are capable of movement from a position eccentric to the casing and in alignment with shaft 2 to a position concentric with the casing and in alignment with the axis of the ring gear 9.

Figs. 10, 11, and 12 are plan views showing the slotted guide plates or gates employed in connection with gear changing operations in both devices.

Similar letters refer to similar parts throughout the several views.

Referring to Figs. 1, 2, 3 and 4, Sheet 1, of the drawings, the propeller shaft which is made in two separate parts, comprises a forward or driving end 1, and a rear or driven end 2. On the latter is mounted a pinion 3 which is normally in engagement with the internal teeth 4 of a flanged sleeve, or wheel 5, mounted upon and rotating with the forward end 1 of the propeller shaft, the said sleeve 5 being provided with grooves or keyways 6 adapted to engage keys or longitudinal projections 7 on a castellated or the like portion 8 of the part 1 of the propeller shaft. 9 is a ring or wheel adapted to revolve on ball bearings 10, 11, and provided with internal teeth 12, 12ª, the latter being always in engagement with the pinion 3; and 13 is a shaft carrier in which the sleeve 5 revolves on ball bearings 14, such shaft carrier being supported by a rod 15 journalled in a bearing 16 formed in the casing 17 which surrounds the propeller shaft and auxiliary gear A. The normal position of the shaft carrier is eccentric as clearly shown in Fig. 4, but it can be moved into a concentric position by turning the rod 15 as hereinafter described.

When the parts are in the position shown in the views aforesaid, the auxiliary gearing A is inoperative, and the drive is transmitted directly from the forward end 1 of the propeller shaft to the rear end, the pinion 3 driving the internally toothed wheel 9; but when the rod 15 which extends to a universal joint where it is mounted in carrier bearing is moved to the left, the teeth 4 of the flange or wheel 5 are disengaged from the pinion 3 whereupon the rod 15 is given a partial turn so as to move the shaft carrier 13 into a concentric position and again moved to the left until the external teeth 4ª on the flanged sleeve 5 engage the internal teeth 12 on the ring 9, the sleeve 5 sliding upon the keys or projections 7 of the propeller shaft 1. The drive is now transmitted from the toothed flange 5 through the internally toothed ring 9 to the pinion 3 and so to the rear end 2 of the propeller shaft causing the back axle of the vehicle to be driven at a higher speed than normal.

The actuation of the rod 15 as above described may be effected by means of a lever 20 pivoted at 21 on a bracket 22 capable of turning in its bearings 23 in a bracket 24 bolted to a sleeve of the gear box or the like, see Fig. 9. One arm of the lever 20 terminates in a universal joint 25 connected to one end of the rod 15, and the other arm terminates in a handle 26 suitably situated with relation to the driver of the vehicle. The lever 20 works within a Z shaped slot or gate 27 formed in an arm 28 of the bracket 24 clearly shown at Fig. 10, Sheet 3 of the drawings.

Set screws 18 extending through the casing 17 limit the oscillatory movement of the shaft carrier 13 in both directions; and a door 19 is provided in the casing 17 for the purpose of inspection and to give easy access to the parts.

Referring to Figs. 5, 6, 7, 8, 9, 10, 11 and 12, Sheets 2 and 3 of the drawings, we dispense with the ring or wheel 9 shown in the other views, and the external teeth 4ª on the flange or wheel 5, and construct the latter with the faces of the internal teeth 4 of greater breadth. We also mount on the rear end 2 of the propeller shaft a double pinion or wheel 3, 3ª, the pinion 3ª being of larger diameter than the pinion 3. The internal teeth 4 are normally in engagement with the pinion 3ª and concentric with the same, the auxiliary gearing being now inoperative and the drive is transmitted directly from the forward end 1 of the propeller shaft to the rear end 2 thereof the wheel 5 driving the double wheel and the rear end 2 through the pinion 3ª; but when the rod 15 is moved to the left by the hand lever 20 as before described, the teeth 4 of the flange or wheel 5 are disengaged from the pinion 3ª whereupon the rod 15 is next given a partial turn by the said lever so as to move the shaft carrier 13 into an eccentric position and then moved to the right until the teeth 4 aforesaid engage the teeth 3 of the double wheel, the sleeve 5 sliding upon the shaft 1 as before described. The drive is now transmitted from the internal wheel 5 through the pinion 3 to the rear end 2 of the propeller shaft causing the back axle of the vehicle to be driven at a higher speed than normal.

In order to stabilize the forward end 1 of the propeller shaft and the shaft carrier 13 during the swinging or floating movement of the end 1 and the running of the propeller shaft at all speeds, and also to limit the longitudinal and oscillatory movement of the shaft carrier 13, we form a projection 29 on the shaft carrier 13 which operates within a U shaped groove or gate 30 in a casting 31 forming a part of or attached to the casing 17 clearly shown at Figs. 5 and 12 of the drawings. A similar gate 32, see Fig. 11 is provided in the arm 28 of the bracket 24 for similarly guiding and limiting the movement of the lever 20, the parallel grooves indicating the longitudinal movements of the rod 15 and the shaft carrier 13 for disengaging and re-engaging the teeth 4 with the pinions 3 or 3ª, and the transverse groove indicates and limits the oscillatory movement of the shaft carrier 13 prior to such re-engagement.

What we do claim as our invention and desire to secure by Letters Patent is:—

1. An auxiliary gearing comprising a drive shaft, a driven shaft normally aligned therewith, a sleeve slidable on the drive shaft, a pinion carried by the sleeve, a carrier in which said sleeve is mounted to revolve, said carrier being mounted for rectilinear and oscillating movement, a pinion on the driven shaft adapted to mesh with the first mentioned pinion in the aligned position of the shafts, means for actuating said carrier to dispose the drive shaft and the pinion thereon in a position out of alignment with the driven shaft, and an intermediate gear element having drive connection with the said driven shaft and adapted to mesh with the gear on the drive shaft in the nonaligned position of the shafts.

2. An auxiliary gearing of the character described, comprising a drive shaft, a driven shaft, a sleeve slidable on the drive shaft, a pinion carried by the sleeve, a carrier in which said sleeve is revolubly mounted, said carrier being capable of rectilinear movement to shift the sleeve and pinion longitudinally of the drive shaft and being also capable of oscillating movement to shift the drive shaft into and out of alignment with said driven shaft, a pinion fixed to the driven shaft adapted to mesh with the first mentioned pinion in the aligned positions of the shafts, a revoluble ring enclosing the adjacent ends of said shafts and fixed in eccentric relation to the driven shaft, teeth at one end of said ring disposed to mesh continuously with the pinion on the drive shaft and teeth at the opposite end of said ring adapted to mesh with the teeth of the pinion of the drive shaft when the latter is positioned out of alignment with the driven shaft.

3. An auxiliary gearing of the character described comprising a drive shaft, a driven shaft, a carrier for one of said shafts capable of oscillating and rectilinear movement, means for oscillating said carrier to shift the drive shaft into and out of alignment with the driven shaft, means for effecting rectilinear movement of the carrier to establish a direct connection between said shafts in the aligned position thereof and an indirect speed changing connection between the shafts in the non-aligned position thereof.

4. An auxiliary gearing of the character described comprising a drive shaft, a driven shaft, a carrier for the drive shaft capable of oscillating and rectilinear movement, means for oscillating said carrier to shift the drive shaft into and out of alignment with the driven shaft, said means being also utilized to effect rectilinear movement of the carrier on the drive shaft, said shifting means comprising a sliding shaft to which the carrier is fixed, an actuating lever connected to said sliding shaft and a rotatable support to which said lever is pivoted and means controlled by movement of the shaft and carrier for establishing a direct drive connection between the shafts in the aligned positions thereof designed to rotate the driven shaft at a rate equal to that of the drive shaft, said means serving to establish an indirect connection between the shafts in the nonaligned position thereof designed to rotate the driven shaft at a rate different from that of the drive shaft.

In testimony whereof we have signed our names to this specification in the presence of two subscribing witnesses.

JOHN ALEXANDER MILLER.
WILLIAM DOUGLAS MILLER.

Witnesses:
ABM. REED.
LUCY OUTHWAITE.